United States Patent
Loussert et al.

(10) Patent No.: US 8,502,426 B2
(45) Date of Patent: Aug. 6, 2013

(54) ROTARY SINGLE-PHASE ELECTROMAGNETIC SERVO ACTUATOR COMPRISING AN ACTUATOR AND A POSITION SENSOR

(75) Inventors: Guillaume Loussert, Besancon (FR); Pierre Gandel, Montfaucon (FR)

(73) Assignee: SONCEBOZ SA, Sonceboz (CH)

( * ) Notice: Subject to any disclaimer, the term of this patent is extended or adjusted under 35 U.S.C. 154(b) by 0 days.

(21) Appl. No.: 13/530,962

(22) Filed: Jun. 22, 2012

(65) Prior Publication Data
US 2012/0326574 A1 Dec. 27, 2012

Related U.S. Application Data

(63) Continuation-in-part of application No. 11/917,611, filed as application No. PCT/FR2006/001359 on Jun. 15, 2006, now Pat. No. 8,222,777.

(30) Foreign Application Priority Data

Jun. 15, 2005 (FR) ...................................... 05 06065

(51) Int. Cl.
*H02K 11/00* (2006.01)
*H02K 23/66* (2006.01)

(52) U.S. Cl.
USPC ....... 310/68 B; 310/36; 310/49.43; 310/68 R; 310/89; 310/156.05; 310/268; 318/400.14

(58) Field of Classification Search
USPC .......... 310/36, 49.43, 68 B, 68 R, 89, 156.05, 310/156.62, 156.64, 168, 268; 318/400.14
IPC .............................. H02K 11/00,23/66
See application file for complete search history.

(56) References Cited

U.S. PATENT DOCUMENTS

| 3,428,840 | A | * | 2/1969 | Kober ........................... 310/114 |
| 4,260,920 | A | | 4/1981 | Nakamura et al. |
| 4,398,167 | A | | 8/1983 | Dickie et al. |
| 4,518,886 | A | | 5/1985 | Kaneyuki |
| 4,801,830 | A | | 1/1989 | Ogino et al. |
| 4,902,923 | A | | 2/1990 | Okauchi |
| 5,041,749 | A | * | 8/1991 | Gaser et al. .............. 310/156.22 |
| 5,101,131 | A | | 3/1992 | Ushiro et al. |
| 5,105,139 | A | | 4/1992 | Lissack |
| 5,124,604 | A | | 6/1992 | Swartz |

(Continued)

FOREIGN PATENT DOCUMENTS

| EP | 1 372 241 | 12/2003 |
| EP | 1 477 772 | 11/2004 |
| WO | 03 069765 | 8/2003 |

OTHER PUBLICATIONS

Melexis, MLX 90316 Application Note, Dec. 2006.*

*Primary Examiner* — John K Kim
(74) *Attorney, Agent, or Firm* — Oblon, Spivak, McClelland, Maier & Neustadt, L.L.P.

(57) ABSTRACT

A single phase electromagnetic servo-actuator that includes a rotary actuator which moves a mobile member along a limited travel including a 2N ferromagnetic pole stator structure and at least one excitation coil, the stator structure being made of a material with high magnetic permeability and a rotor having ferromagnetic yoke and a thin magnetized portion of 2N pairs of axially magnetized poles, in alternate directions, and a rotor angular position sensor, the thin magnetized portion being a separate element from the ferromagnetic yoke.

1 Claim, 8 Drawing Sheets

(56) References Cited

U.S. PATENT DOCUMENTS

| | | | |
|---|---|---|---|
| 5,168,183 A * | 12/1992 | Whitehead | 310/12.09 |
| 5,337,030 A * | 8/1994 | Mohler | 310/156.37 |
| 5,361,010 A | 11/1994 | Muller | |
| 5,530,303 A | 6/1996 | Takei | |
| 5,608,278 A | 3/1997 | Mey et al. | |
| 5,633,546 A * | 5/1997 | Horst | 310/68 B |
| 5,825,104 A | 10/1998 | Kondo et al. | |
| 5,874,796 A | 2/1999 | Petersen | |
| 5,895,992 A | 4/1999 | Dreher | |
| 5,942,824 A | 8/1999 | Shioya et al. | |
| 5,945,766 A | 8/1999 | Kim et al. | |
| 6,005,320 A | 12/1999 | Kim et al. | |
| 6,020,804 A * | 2/2000 | Gandel | 335/272 |
| 6,064,133 A | 5/2000 | Kim et al. | |
| 6,351,048 B1 | 2/2002 | Schob et al. | |
| 6,355,998 B1 | 3/2002 | Schob et al. | |
| 6,507,257 B2 * | 1/2003 | Mohler | 335/220 |
| 6,573,623 B2 | 6/2003 | Tsuboi et al. | |
| 6,731,032 B1 | 5/2004 | Muszynski | |
| 6,753,628 B1 | 6/2004 | Neal | |
| 6,762,527 B1 | 7/2004 | Horng | |
| 6,806,664 B2 | 10/2004 | Beishline | |
| 6,917,126 B2 | 7/2005 | Tsuboi et al. | |
| 7,030,518 B2 | 4/2006 | Tsuboi et al. | |
| 8,222,777 B2 * | 7/2012 | Loussert et al. | 310/68 B |
| 2001/0048249 A1 | 12/2001 | Tsuboi et al. | |
| 2001/0054851 A1 | 12/2001 | Tsuboi et al. | |
| 2002/0008513 A1 | 1/2002 | Hiligsmann et al. | |
| 2002/0047348 A1 | 4/2002 | Ohiwa et al. | |
| 2004/0130316 A1 | 7/2004 | Grueger et al. | |
| 2005/0073212 A1 | 4/2005 | Semones et al. | |
| 2005/0109155 A1 | 5/2005 | Oh et al. | |
| 2005/0258689 A1 | 11/2005 | Kitade | |
| 2008/0197728 A1 * | 8/2008 | Loussert et al. | 310/71 |
| 2012/0326574 A1 * | 12/2012 | Loussert et al. | 310/68 B |

* cited by examiner

ROTARY SINGLE-PHASE ELECTROMAGNETIC SERVO ACTUATOR COMPRISING AN ACTUATOR AND A POSITION SENSOR

This is a continuation-in-part of U.S. application Ser. No. 11/917,611, filed Mar. 12, 2008, the entire content of which is incorporated herein by reference. U.S. application Ser. No. 11/917,611 is the National Stage of PCT Application No. PCT/FR06/01359, filed Jun. 15, 2006, and claims the benefit of priority under 35 U.S.C. §119 from French Patent Application No. 05 06065, filed Jun. 15, 2005.

The present invention relates to an electromagnetic servo-actuator comprising a rotary single-phase actuator producing a constant torque on a limited angular travel, including a rotor consisting of a ferromagnetic material yoke and 2N pairs of axially magnetized poles, in alternate directions and a stator structure respectively including 2N ferromagnetic poles and at least one coil, and a rotor position sensor.

This combination of an actuator with a sensor is intended to move, in rotation and in a non-limitative way, an air intake valve for an internal combustion engine.

It is already known, in the prior art, to combine an actuator and an electromagnetic sensor for actuating a valve and more particularly for motor vehicles. The solutions used generally lead to solutions having various disadvantages: significant overall dimensions because of the intrinsic overall dimensions of both actuator and sensor members, disturbance of the signal from the sensor during the operation of the actuator, difficult indexing between the sensor and the valve position.

One of the objects of the present invention consists in remedying these disadvantages by providing an innovative solution for the man skilled in the art.

For this purpose, an object of the present invention is to provide an electromagnetic servo-actuator comprising an innovative actuator+sensor assembly, wherein that the sensor is incorporated on the actuator yoke in a simple way, without any influence from the magnetic field created by the actuator on the sensor.

Advantageously, the yoke of the actuator is made of a ferromagnetic material with a high magnetic permeability which creates a magnetic armoring and avoids any influence from the engine on the sensor signal. In addition and preferably, the magnetism-sensitive probe, the receiver of the magnetic field, is placed in at least one neutral plane relative to the stator poles of the actuator where the influence of the engine magnetic field is null.

In a preferred embodiment, the sensor used is of the type described in patent FR2670286. This type of sensor makes it possible to work around a 0 Gauss signal, insensitive to the variations of temperature. It includes a magnetic field emitter in the form of a ring magnet positioned between two collection circuits formed by two ferromagnetic arcs which partially enclose the ring magnet. The adjustment of such 0 Gauss position requires an indexing of the sensor magnet relative to the sensor stator. However, it is possible to use other types of sensors and one of the objects of this application is to allow the utilization, according to various embodiments, of various types of sensors using magnetism-sensitive probes or inductive sensors.

Another object of the invention is also to allow the utilization of a digital type sensor, which is used only for detecting the beginning and/or the end of the travel.

In the present state of the art are known electromagnetic actuators capable of performing the motion of a valve with a proportional constant torque. The publication FR2670629 discloses, for this purpose, an actuator with a rotor having 2N pairs of magnetized poles producing a torque proportional to the feed current and allowing the self-centering of the rotor, thanks to the combination of an axial stop and the axial electromagnetic force of the magnets on the stator part.

However, the embodiment of this actuator does not allow an optimum utilization and an industrial production. Besides, the significant overall dimensions of the combination of such an actuator with an angular position sensor, (a combination which is often indispensable in motor vehicle applications, for safety reasons), is redhibitory for a realistic utilization of the assembly.

Another object of the present invention is thus to provide an actuator having an innovative structure making it possible to obtain a strong constant torque, proportional to the control current, to limit the number of parts, while improving the thermal behavior of the actuator during its operation and to make the servo-actuator applicable in the industry.

Preferably, the stator poles are produced using a so-called "cold heading method" in a cast material, which provides a high ferromagnetic quality. The stator poles thus produced are then mechanically expelled into a base plate made of a ferromagnetic material which provides an optimum magnetic joint and limits the occurrence of a residual torque during the displacement of the rotor, comprising a yoke+the motor magnetized poles, above the stator poles. The arrangement of the magnetic poles on the base defines the seat of a stop support, intended to receive a stop on which the rotor comes to rest, thanks to a shoulder made on each of the 4 poles during the production thereof, while using the cold heading method.

According to an advantageous embodiment, the stator assembly thus formed can then be overmolded with a thermoplastic polymer of the LCP type (Liquid Crystal Polymer). Using such methods makes it possible to produce the guiding bearing and the support of the rotor stop in only one operation and in a simple and cost effective way, while providing an improvement of the temperature resistance, through the easier discharge of the electric power dissipated by Joule effect, by the electric supply coils.

Another object of the present invention is to provide a servo-actuator provided with a locking and unlocking system capable of blocking any external mechanical action applied to the actuator-driven outlet pin, without hindering the actuator-driven motion of the member to be moved in both directions of rotation of this member. Such combination of the servo-actuator+the locking and unlocking system makes it possible to produce an undersized actuator for a given application since external reaction forces which are exerted on the controlled rotation pin are no longer to be overcome. This makes it possible to spare room and to have a decisive cost saving for an important number of applications and makes it possible to use such actuator in multiple applications which could not be used without such combination.

Understanding the description will be easier while referring to the appended drawings, in which.

Figure 1:
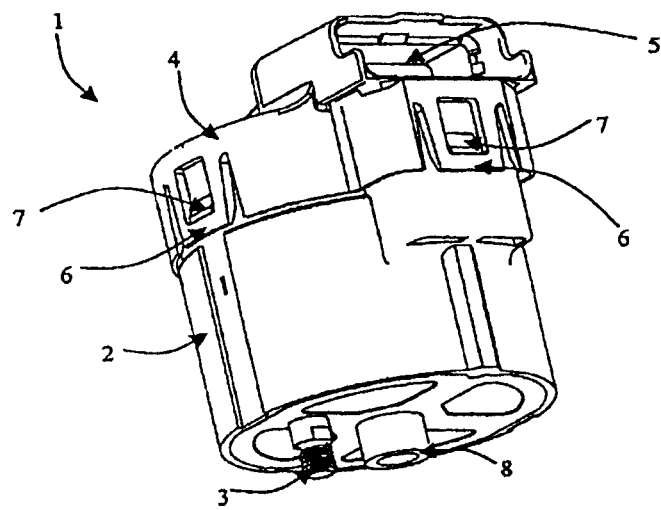
FIG. 1 shows a three-quarter view of the servo-actuator described in the present invention, in its preferred embodiment.

FIG. 1 shows the servo-actuator 1, such as shown in a preferred embodiment. It is composed of an overmolded stator assembly 2 on which one or several studs 3 can be placed to fasten the servo-actuator 1 on an external frame, as well as a lid 4 integrating an assembly of electric connections 5 used for driving the actuator and electromagnetic sensor, and for producing the electric signal from the sensor, for example including a Hall probe. The lid 4 is integrally linked to the overmolded stator assembly 2 by clipping cutout legs 6 extending the lid 4 with protruding grippers 7 of said overmolded stator assembly 2. The face opposite the lid 4 has a bearing 8 formed in the overmolded stator assembly 2 through which the actuator pin (not shown) extends to be fixed on an outside members to be positioned and moved in rotation.

Figures 2A, 2B:
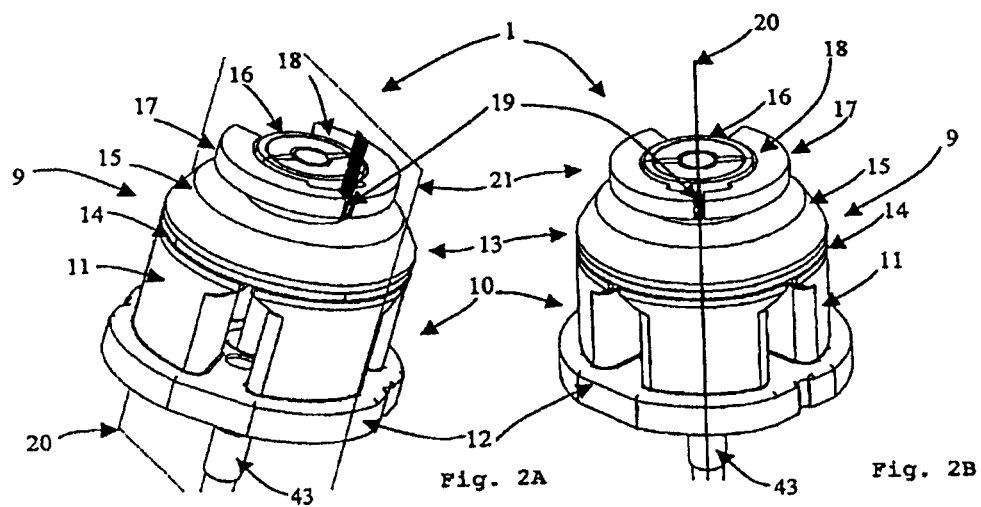
FIGS. 2A and 2B show separate views of the servo-actuator, according to a first embodiment of the sensor, without the overmolding assembly.

In FIGS. 2A and 2B, is shown the servo-actuator 1, consisting of an actuator 9 and a sensor 21, without the overmolding elements nor the lid 4, and according to a first embodiment. The actuator 9 which composes it is composed of a first stator assembly 10 comprising here 4 stator poles 11, extending in the axial direction of the actuator, fixed on the base 12 and a rotor 13 including an axially alternately magnetized disc 14 having four pairs of magnetic poles and one yoke 15 made of a ferromagnetic material. Such yoke 15 is axially extended to support a second magnet 16, having a ring shape, including two pairs of magnetized poles in the radial direction, alternatively. This second magnet 16 is thus integral with the yoke 15 and rotates inside a second stator assembly 17 which is stationary with respect to the stator. It is constituted of two ferromagnetic arcs 18 partially enclosing the second ring magnet 16 between which a magnetism-sensitive probe 19 having a Hall effect is positioned. Preferably, the magnetism-sensitive probe 19 is positioned in such a way that preferably the magnetism-sensitive probe 19 is placed such that its detection sensitive element is placed in the middle plane 20 of at least one of the stator poles 11, an area free of any magnetic induction. The ferromagnetic arcs 18 are thinner at the level of the magnetism-sensitive probe 19, which makes it possible to concentrate the flow magnetic flow from the second magnet field 16. The flow collected at the magnetism-sensitive probe 19 is thus a linear function of the position of the yoke 15 and thus of the external member driven by said yoke 15 with the help of a through pin (43).

Figure 3:
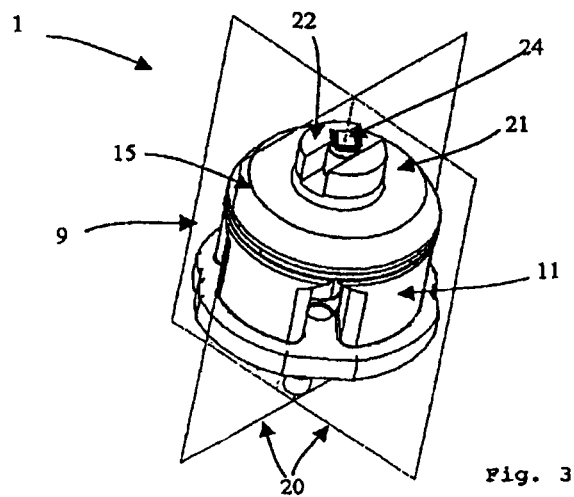
FIG. 3 shows a separate view of the servo-actuator according to a second embodiment of the sensor, without the overmolding assembly.

FIG. 3 shows the servo-actuator 1 according to a second embodiment of the sensor 21 and without any overmolding or lid 4. The yoke 15 of the actuator has a U ferromagnetic shape 22 having a coercitive field force lower than has 500 Oersteds which has a residual axial magnetization. In the axis of such U ferromagnetic shape 22 corresponding to the intersection of the middle planes 20 of symmetry of the stator poles 11, is placed a Hall probe 24, for instance of the Melexis 90316 type which has at least 2 Hall sensitive elements. Such sensitive elements sense the induction generated by the U ferromagnetic shape 22 according to two perpendicular directions. Preferably, but not limitatively, these two orthogonal directions are defined by the middle planes 20 of symmetry of the stator poles 11. The output signal obtained is a linear function of the rotation angle of the U ferromagnetic shape 22 and the signal is not disturbed by the operation of the actuator 9, since the sensitive elements of the Hall probe 24 are placed close to the axis of such actuator 9, an area free of any magnetic induction.

Figure 4:
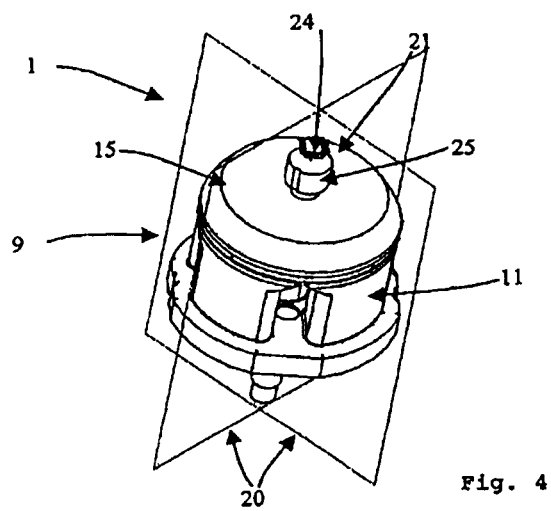
FIG. 4 shows a separate view of the servo-actuator, according to a third embodiment of the sensor, without the overmolding assembly.

FIG. 4 shows the servo-actuator 1 according to a third embodiment of the sensor 21 and without any overmolding or lid 4. The yoke 15 of the actuator has a diametrically magnetized cylindrical ferrite magnet 25. In the axis of this cylindrical ferrite magnet 25, corresponding to the intersection of the middle planes of symmetry of the stator poles 11, is placed a Hall effect probe 24, for instance of the Melexis 90316 type, which has further at least two Hall sensitive elements. Such sensitive elements sense the induction generated by the cylindrical ferrite magnet 25 according to two orthogonal directions. Preferably but not limitatively, such two orthogonal directions are defined by the middle planes 20 of symmetry of the stator poles 11. The output signal obtained is a linear function of the rotation angle of the cylindrical ferrite magnet 25 and the signal is not disturbed by the operation of the actuator 9 since the sensitive elements of the hall probe 24 are placed close to the pin of such actuator 9, an area free of any magnetic induction.

Figure 5:
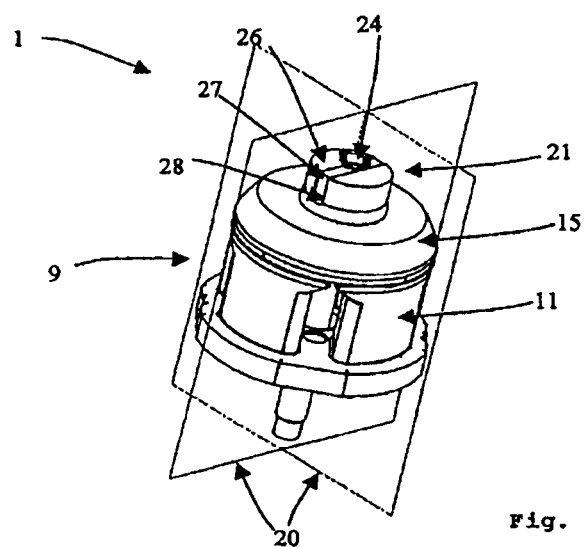
FIG. 5 shows a separate view of the servo-actuator, according to a fourth embodiment of the sensor, without the overmolding assembly.

FIG. 5 shows the servo-actuator 1 according to a fourth embodiment of the sensor 21 and without any overmolding or lid 4. The yoke 15 of the actuator has a U shape 26 and is made of any material which provides the positioning of the magnet 27 in the slot 28 of the U shape 26. In the axis of the U shape 26, corresponding to the intersection of the middle planes of symmetry of the stator poles 11, is placed a Hall probe 24, for example of the Melexis 90316 type, which has at least 2 Hall sensitive elements according to two orthogonal directions. Preferably, but not limitatively, such two orthogonal directions are defined by the middle planes 20 of symmetry of the stator poles 11. Such sensitive elements sense the induction generated by the magnet 27. The output signal obtained is a linear function of the rotation angle of the magnet 27 and the signal is not disturbed by the operation of the actuator 9, since the sensitive elements of the Hall probe 24 are placed close to the axis of such actuator 9, an area free of any magnetic induction.

Figure 6:
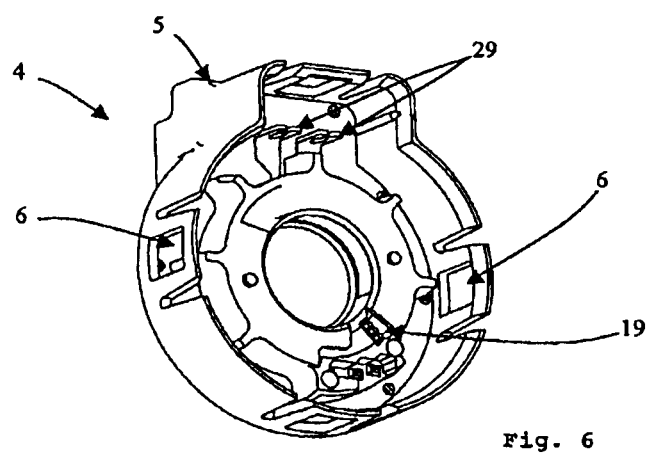
FIG. 6 shows a separate view of the lid of the servo-actuator intended to be fixed on the overmolded stator assembly.

FIG. 6 shows the lid 4 closing the servo-actuator 1 according to a first embodiment of the sensor 21. It contains the stator assembly of the sensor 21, as well as the magnetism-sensitive probe 19 used to measure the magnetic flux produced by the sensor 21 described in FIGS. 2A and 2B. In this embodiment, the magnetism-sensitive probe 19 is a Hall probe which receives, proportionally to the rotor position 13, the magnetic flux produced by the second sensor magnet 16 positioned on the yoke of the rotor 13 of the actuator 9. The position of the stator assembly of the sensor 21 and of the magnetism-sensitive probe 19 relative to the stator poles 11 is provided by the overmolding of the servo-actuator 1. In combination with the second sensor magnet 16, which is also positioned on the yoke 15 relative to the axially magnetized disc 14 of the actuator 9, the assembly thus formed makes it possible to obtain in a repetitive way in production a servo-actuator 1, which is compact and knows the absolute position of the rotor 13. The lid 4 obtained has cutout legs 6 which are intended to provide the connection and the hold of the lid 4 with the overmolded stator assembly 2. It also has two electric connection elements 29 intended to provide the electric connection of the overmolded stator assembly 2. Such electric connection elements 29 which are in the form of slotted rotor plate, which is a shape providing an elastic connection insensitive to positioning tolerances between the stator assembly 2 and the lid 4 during their assembly. The electric connection of the actuator 9 and the sensor 21 is carried out at the level of the electric connection assembly 5 of the lid 4. Using an external connector (not shown) it is thus possible to connect the servo-actuator 1 of the present invention.

Figure 7:
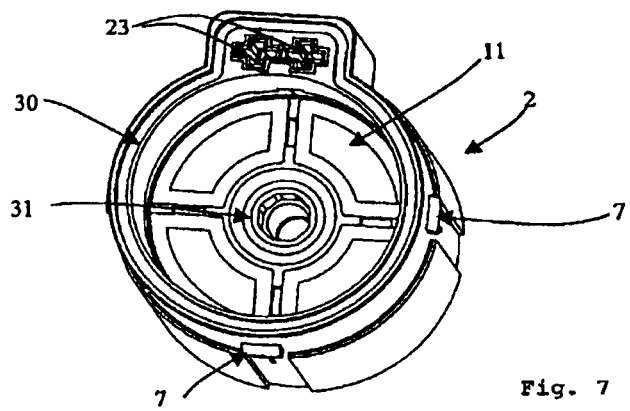
FIG. 7 shows the stator assembly with its LCP overmolding.

FIG. 7 shows the overmolded stator assembly 2. In an advantageous embodiment, the overmolding of the stator assembly 10 is made in a thermoplastic material such as a LCP (Liquid Crystal Polymer). Such overmolding, encompassing the stator poles 11 and the electric supply coils 33, makes it possible, on the one hand, to more easily evacuate the heat produced by a Joule effect at the level of the coils 33 during the supply thereof, and on the other hand makes it possible to produce, without any additional step, a stop support 31 made of LCP, coming to rest on the shoulders 48 of the stator poles 11, as well as a bearing, not shown in the Figure, on the face opposite the lid 4 of the actuator 9. In addition, the overmolding makes it possible to provide the mechanical connection of the overmolded stator assembly 2 with the lid 4 thanks to the presence of protruding grippers 7, on which the cutout legs of 6 of the lid 4 are clipped and thanks to the presence of a groove 30 in the overmolding which is intended to receive an adhesive paste ensuring the contact of the overmolded stator assembly 2 with the lid 4. The electric connection is carried out at the level of the cross-shaped electric connection area 33, which allows the elastic connection of two electric connection elements 29 of the lid 4 in the form of slotted rotor plates. Eventually, the overmolding has an anti-vibration function which protects the servo-actuator 1 against the external vibration during the operation of the assembly in the application.

Figure 8:
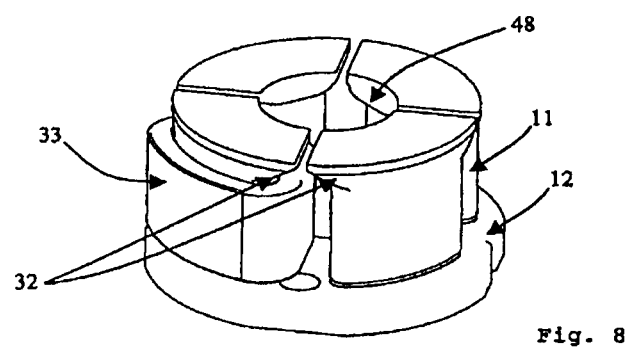
FIG. 8 shows the stator assembly without the LCP overmolding.

FIG. 8 shows a separate view of the stator poles 11 of the actuator, mechanically expelled into a base 12 made of a ferromagnetic material. The four stator poles 11 have, each, a pole shoe 32 at the level of their heads, which makes it possible to increase the useful angular travel and to reach a value close to 80°. The association of the four stator poles 11 and the pole shoes 32 with the magnetized poles of the rotor makes it possible to obtain a torque ratio on an optimum number of poles. In an advantageous embodiment, the stator poles 11 are obtained by means of the so-called "cold heading" method making it possible to obtain them in only one operation. To provide good magnetic flux conduction, the stator poles 11 are mechanically expelled into a base 12 made of a ferromagnetic material. The flatness of the stator poles 11 as on at the level of their heads is provided from the rear of the base 12, where the base of the stator poles 11 is not flat. Thanks to the mechanical expelling action, the magnetic joint obtained is optimum and makes it possible not to create any magneto-static residual torque, and to provide the proper conduction of the magnetic induction flux between the stator poles 11 without deforming the currentless torque of the actuator 9. Advantageously, such stator poles 11, has shoulders 48 which are used as seats for a stop support 31 of the rotor 13 of the actuator 9. The electric supply coils 33 used for generating the magnetic flux used by the actuator 9 are placed on each of the stator poles 11. In FIG. 8, only one of such coils 33 is shown.

Figure 9:
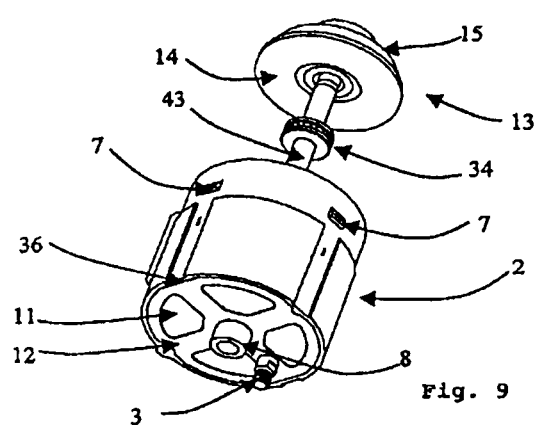
FIG. 9 shows an exploded view of the stator assembly with its LCP overmolding, the rotor and its axial stop.
Figure 10:
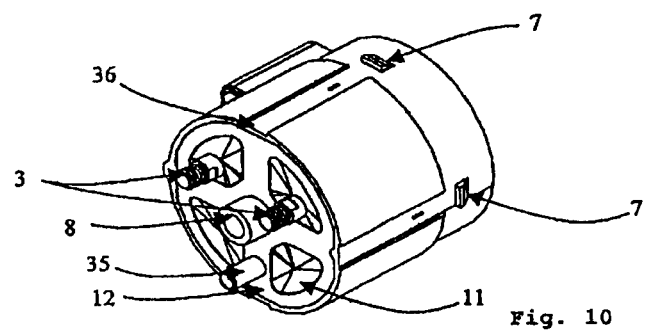
FIG. 10 shows a view of the horizontal overmolded stator assembly.

FIG. 9 shows an exploded view of the overmolded stator assembly 2, an axial stop 34 and the rotor 13 of the electromagnetic actuator 9 provided for the present invention. The axial stop 34 comes to rest on the stop support 31 constituted of the overmolded stator assembly 2. The rotor 13 of the actuator, constituted of a yoke 15 made of a ferromagnetic material and an axially magnetized disc having four pairs of magnetized poles in alternate directions, then comes in contact with the axial stop 34, which is guided thanks to its pin 43 which is integral with the bearing 8 made in the overmolded stator assembly 2 on the face opposite the lid 4. Thanks to this advantageous embodiment, the magnetic attraction of the rotor 13 on the stator poles 11 associated with the axial and radial guiding constituted by the axial stop 34 and the bearing 8, respectively made in the overmolded stator assembly 2, provides at least self-centering and the parallelism of the rotor 13 with respect to the surface of the stator poles 11. At the back of the overmolded stator assembly 2 can be placed one or several studs 3 which are threaded and capable of providing the fastening of the servo-actuator on an external element for example the air intake valve of a vehicle. The shape and the number of the studs 3 are not limited and for example two studs 3 can be positioned as indicated in FIG. 10. Such stud 3 can be associated with a guiding element 35 for positioning the servo-actuator 1 prior to fixing it. Such guiding 35 and fastening elements are generally screwed into the base 12 or the stator pole base 11, since the back of the actuator 9 is free of any over molding in order to allow a better evacuation of heat emitted in Joule by the actuator 9 during the operation in the application. The positioning of the actuator is further facilitated flat lock 36 at the base level 12.

Figure 11:
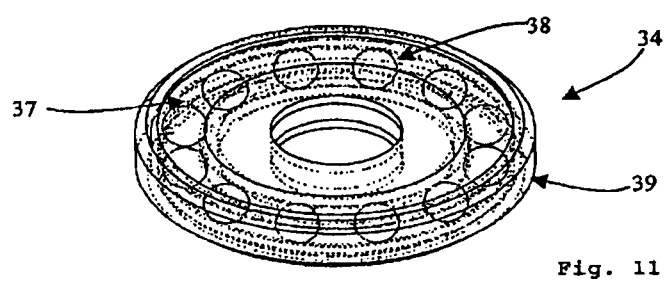
FIG. 11 shows an isolated view of a ball stop in a preferred embodiment, which can be used to provide the positioning and the free rotation of the actuator rotor on the stator part.

FIG. 11 shows a ball thrust bearing 34 which can be used in a non-limitative way in the present invention. Preferably, such ball thrust bearing 34 is composed of 3 simple assemblies: an assembly of two flanges 37 containing an assembly of balls 38 sliding between the two flanges 37 which are themselves retained in a ball bearing housing 39 generally made of plastic material and providing a cohesion of the ball thrust bearing 34. Both flanges 37 can thus slide with respect to each other, independently. Such ball thrust bearing 34 is placed on the overmolded stator assembly 2 and it supports the rotor 13, provides its self-centering and enables it to rotate when it is placed on the overmolded stator assembly 2, while limiting the friction to a minimum.

Figure 12:
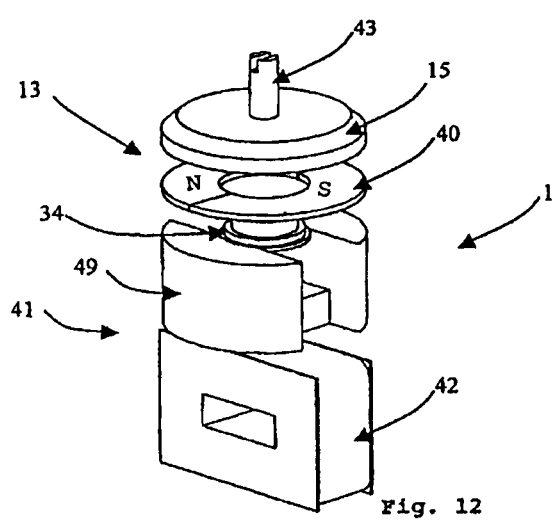
FIG. 12 shows a separate view of the servo-actuator without the overmolding according to a second embodiment of the actuator.

FIG. 12 shows a servo-actuator 2 according to the teachings of the present invention and according to a second embodiment of the actuator 9 and for which the details of the embodiment of the actuator 9 disclosed in the present application can be applied. Such actuator 9 thus shows a rotor 13 constituted of a yoke 15 on which a magnet 40 having two pairs of pole is made integral. Such rotor is positioned on ball thrust bearing 34 which is itself positioned on a stator part 41 composed of two ferromagnetic poles 49 and an electric supply coil 42. In this example which is non-limitative, as regards the type of the sensor used, the pin 43 is U-shaped in its upper part and made of a material having a coercitive field force lower than 500 Oersteds and having a residual axial magnetization as indicated in FIG. 3 in the second embodiment of the sensor 21.

Figure 13:
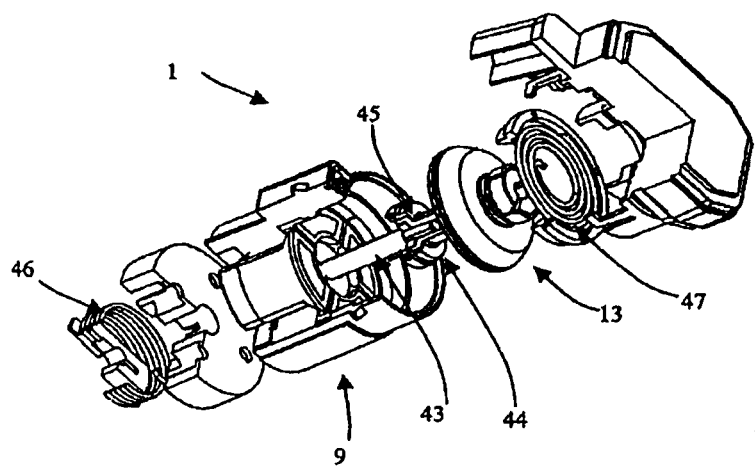
FIG. 13 shows a separate view of the servo-actuator of FIG. 1 associated with a mechanical locking and unlocking system.

In FIG. 13, the servo-actuator 1 disclosed in the present application is associated with the locking and unlocking system 44, here a mechanical system the function of which consists in blocking the external mechanical actions exerted on the output pin. Therefore, it has a mechanical locking system 45 located under the rotor 13 of the actuator 9 and composed of two distinct parts moving with respect to one another and the function of which is to enable the locking of any external action without preventing the actuator-driven motion. The addition of such a locking/unlocking system 44 makes it possible to undersize the actuator for a given overall dimension, since it is no longer sensitive to the fluctuations of the external load exerted on the member driven by the pin 43 connected in a stationary way to the rotor 13. Such system is then constituted of a mechanical assembly, but such embodiment is not limitative and can be made with an assembly of another nature (electromagnetic, hydraulic, and pneumatic).

Figure 14:
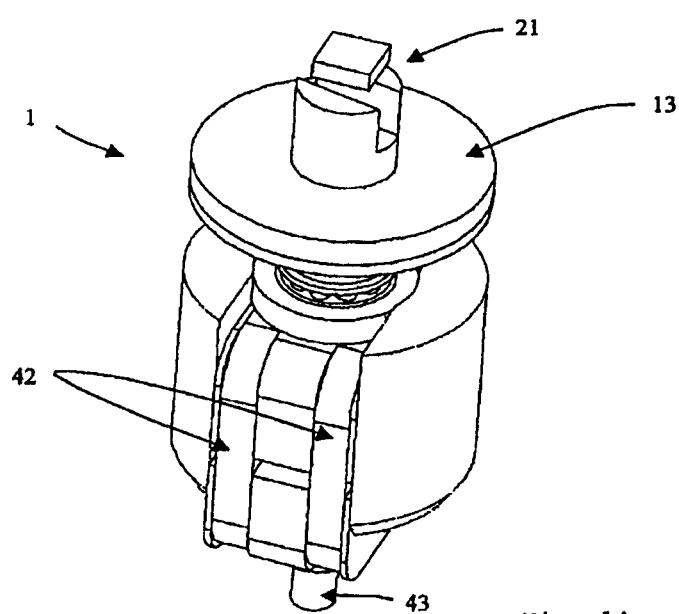
FIG. 14 shows an alternative servo-actuator of FIG. 12 for which the rotor has a through pin.

FIG. 14 shows an alternative to the servo-actuator 1 of FIG. 12 for which the pin 43 of the rotor 13 goes through its support towards the back of the actuator 9, with a view to moving a member to the back of the actuator 9. For this purpose, the coils 42 of the actuator are physically separated in two, so that they give room enough for the pin 43, through the actuator 9. Such configuration makes it possible to position a sensor 21 at the top of the rotor 13, since the outlet of the pin 43 is not required at the top of the rotor 13. Then, the utilization of any type of sensors can be considered like those described in the present application, without being limitative.

Figure 15:
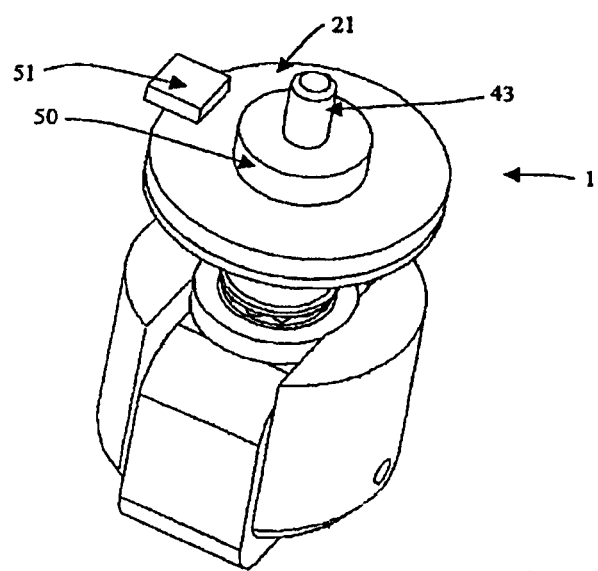
FIG. 15 shows an alternative servo-actuator of FIG. 12 using a sensor capable of letting the actuator rotor pin through, upwards.

FIG. 15 shows an alternative to the servo-actuator 1 of FIG. 12 for which the sensor 21 comprises a diametrically magnetized cylindrical field emitter 50, integral with the pin 43, in the vicinity of which a field receiver 41 comprising two magnetism-sensitive members capable of measuring the tangential and radial or tangential and axial components of the emitted magnetic field is positioned in a stationary way. The field receiver 51 then comprises a processing circuit capable of making the combination of the two components in order to determine the rotation angle of the pin 43. In such a configuration, the field receiver 51 of the sensor 21 being shifted with respect to the pin 43, the pin 43 can thus be protruding outside towards the top of the actuator 9 and can thus be fixed to a member to be moved.

Figure 16:
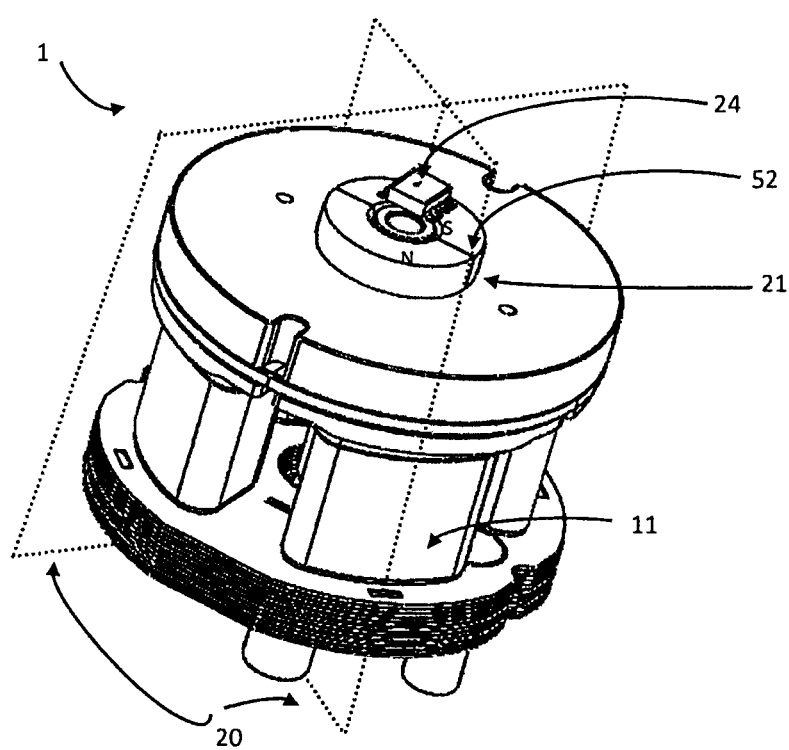
FIG. 16 shows an alternative servo-actuator according to a fifth embodiment of the sensor.

FIG. 16 shows the servo-actuator 1 according to a fifth embodiment of the sensor 21 and without any overmolding or lid (that are hidden). The yoke 15 of the actuator has a cylindrical magnet 52 with two pairs of axially magnetized poles. In the axis of this magnet 52, corresponding to the intersection of the middle plane of symmetry of the stator poles 11, is placed a Hall effect probe 24, which has further at least two Hall sensitive elements. Such sensitive element sense the induction generated by the magnet 52 according to two orthogonal direction. The output signal obtained is not disturbed by the cylindrical magnet 52 since the sensitive elements of the Hall probe 24 are placed close to the axis of the magnet 52, an area free of any magnetic induction coming from the actuator.

The probe is for instance the Melexis 90316 type, with an Integrated magneto-concentrator that concentrates the applied magnetic flux density parallel to the IC surface. At the boundaries of the magneto-concentrator structure, an orthogonal component proportional to the applied flux density can be measured by two pairs of conventional planar Hall plates located orthogonally under the magneto-concentrator and for each of the two directions parallel with the IC surface (X and Y). The first part of the sensor encodes a mechanical angle into two sinusoidal signals with 90° phase shift (sine and cosine). The two signals (Vx & Vy) proportional to the magnetic field are amplified, sampled and converted in the digital domain. The digital representations of the two signals are then used to calculate the angle through an Arctangent function applied on the ratio Vy/Vx. The Arctangent function is implemented by a look-up table.

The cylindrical magnet 52 is laid on the ferromagnetic yoke 15 so that the flux coming from the magnet 52 goes into the yoke 15, having high permeability, before going into the probe 24, ensuring an enhancement on the magnetic signal sense by the probe 24. The yoke 15 has then the function of enhancement of the induction for the magnet of the actuator and the magnet of the sensor.

In sensitive applications requiring a resilient return system to provide for the return to the initial position of the member to be controlled, such locking/unlocking system 44 further makes it possible to divide the resilient return system in two, thus separating the mechanical torque to be overcome with the actuator for moving the member to be moved against the spring. FIG. 13 showing such a servo-actuator 1 equipped with a return system, shows a first resilient return member 46 in the form of a torsion spring located under the actuator and applying its return couple to the pin 43 controlled by the actuator 9. A second resilient return member 47 in the form of a torsion spring is located at the level of the actuator 9 rotor 13 and applies its return torque directly to the rotor 13. Thus, when the locking system 45 is locked, the actuator has to overcome only a second resilient return member 47 to position the member to be controlled. When the locking system is unlocked, both torques of both resilient return members 46 and 47 add up to reposition the member to be moved in its initial position. This makes it possible to undersize the servo-actuator 1 and to use it in applications which it would not be fit for, without this locking/unlocking system 44.

The invention claimed is:

1. A single phase electromagnetic servo-actuator comprising:
a rotary actuator configured to move a mobile member along a limited travel including a 2N ferromagnetic pole stator structure, N being equal to 1 or 2, and at least one excitation coil, the stator structure being made of a material with high magnetic permeability and a rotor having ferromagnetic yoke and a thin magnetized portion of 2N pairs of axially magnetized poles, in alternate directions, and a rotor angular position sensor, the thin magnetized portion being a separate element from the ferromagnetic yoke,
wherein the position sensor includes a magnetic field emitter integral with the ferromagnetic yoke and a magnetic field receiver for a magnetic field of the magnetic field emitter stationary relative to the stator structure,
wherein the magnetic field receiver is close to the magnetic field emitter and is located in a middle plane of symmetry of at least one of the ferromagnetic stator poles,
wherein the magnetic field receiver includes a probe configured to measure two plane components and positioned on an axis formed by an intersection of the middle planes of symmetry of the poles, and
wherein the magnetic field emitter includes a ring magnet, the ring magnet having two pairs of axially magnetized poles, the ring magnet laying on the ferromagnetic yoke so that magnetic flux of the ring magnet goes into the yoke.

* * * * *